(12) United States Patent
Fischer et al.

(10) Patent No.: US 12,554,176 B2
(45) Date of Patent: Feb. 17, 2026

(54) NONLINEAR OPTICAL SYSTEM AND METHOD FOR OPTICAL INFORMATION PROCESSING

(71) Applicants: INSTITUT NATIONAL DE LA RECHERCHE SCIENTIFIQUE, Quebec (CA); GOTTFRIED WILHELM LEIBNIZ UNIVERSITÄT HANNOVER, Hannover (DE)

(72) Inventors: Bennet Fischer, Montreal (CA); Piotr Roztocki, Longueuil (CA); Mario Chemnitz, Jena (DE); Cristina Rimoldi, Turin (IT); Benjamin Maclellan, Stirling (CA); Luis Romero Cortes, Aljaraque (ES); Michael Kues, Hannover (DE); Jose Azana, Montreal (CA); Yoann Jestin, Montreal (CA); Roberto Morandotti, Montreal (CA)

(73) Assignees: INSTITUT NATIONAL DE LA RECHERCHE SCIENTIFIQUE, Quebec (CA); GOTTFRIED WILHELM LEIBNIZ UNIVERSITAT HANNOVER, Hannover (DE)

(*) Notice: Subject to any disclaimer, the term of this patent is extended or adjusted under 35 U.S.C. 154(b) by 448 days.

(21) Appl. No.: 18/014,871

(22) PCT Filed: Jul. 14, 2021

(86) PCT No.: PCT/CA2021/050972
§ 371 (c)(1),
(2) Date: Jan. 6, 2023

(87) PCT Pub. No.: WO2022/011470
PCT Pub. Date: Jan. 20, 2022

(65) Prior Publication Data
US 2023/0296960 A1    Sep. 21, 2023

Related U.S. Application Data

(60) Provisional application No. 63/051,435, filed on Jul. 14, 2020.

(51) Int. Cl.
*G02F 1/35*    (2006.01)
*G06E 1/02*    (2006.01)

(52) U.S. Cl.
CPC ............... *G02F 1/353* (2013.01); *G06E 1/02* (2013.01)

(58) Field of Classification Search
CPC ........... G02F 1/353; G02F 3/024; G06E 1/02; G06N 3/006; G06N 3/084; G06N 3/126
See application file for complete search history.

(56) References Cited

U.S. PATENT DOCUMENTS 6,724,783 B2    4/2004    Jalali et al.
7,139,478 B2 *  11/2006   Eggleton ............ H04B 10/2569
                                              398/147

(Continued)

FOREIGN PATENT DOCUMENTS

WO    WO 2019/200289    10/2019
WO    WO 2021/050550    3/2021

OTHER PUBLICATIONS

International Search Report issued on Oct. 26, 2021 in corresponding PCT Application No. PCT/CA2021/050972.

(Continued)

*Primary Examiner* — Manuel A Rivera Vargas (57) ABSTRACT

An optical information processing system comprising a nonlinear element selected in relation to input optical pulses to initiate nonlinear optical frequency conversion and a (Continued)

detection unit, the nonlinear element receiving encoded information input in form of pulsed light, pulsed light from the nonlinear element being read-out by the detection unit for spectro-temporal feature extraction, and the readout being used to train the system on a specific target to obtain a task-specific output or re-directed to the nonlinear element to obtain an input-dependent output, yielding processed information comprising selective positions in an output of the system. A method for training an optical system comprises, for each individual optical input information, reading specific optical amplitude or phase features from specific output bins of the system in time or frequency, weighting and evaluating the specific features towards optimizing user-defined fitness function to identify, classify, or fit the input information.

20 Claims, 5 Drawing Sheets

(56) References Cited

U.S. PATENT DOCUMENTS

| | | | | |
|---|---|---|---|---|
| 7,352,504 | B2* | 4/2008 | Hirooka | G02F 1/3515 359/326 |
| 10,268,232 | B2 | 4/2019 | Harris et al. | |
| 10,908,026 | B2* | 2/2021 | Maia Da Silva | H01S 3/0014 |
| 2017/0351293 | A1 | 12/2017 | Carolan et al. | |
| 2019/0226989 | A1* | 7/2019 | Karpf | H01S 5/146 |
| 2020/0209709 | A1* | 7/2020 | Suchowski | G02F 1/355 |
| 2022/0253685 | A1* | 8/2022 | Ozcan | G06N 3/084 |

OTHER PUBLICATIONS

Chang et al., Hybrid optical-electronic convolutional neural networks with optimized diffractive optics for image classification, Scientific Reports (2018) 8:12324.

Fang et al., Design of optical neural networks with component imprecisions, Optics Express 14009, vol. 27 No. 10, May 13, 2019.

Goda et al., Serial time-encoded amplified imaging for real-time observation of fast dynamic phenomena, Nature, vol. 458, Apr. 30, 2019.

Lin et al., All-optical machine learning using diffractive deep neural networks, Science 361, 1004-1008, Sep. 7, 2018.

Shen et al., Deep learning with coherent nanophotonic circuits, Nature Phononics, vol. 11, Jun. 12, 2017.

Wetzel et al., Customizing supercontinuum generation via on-chip adaptive temporal pulse-splitting, Nature Communication, 2018.

Willner et al., All-Optical Signal Processing, Journal of Lightwave Technology, vol. 32, No. 4, Feb. 15, 2014.

Zhang et al., Low-Depth Optical Neural Networks, Physics.Optics, May 18, 2019.

Zhou et al., Self-learning photonic signal processor with an optical neural network chip, (2019).

* cited by examiner

FIG. 5B

NONLINEAR OPTICAL SYSTEM AND METHOD FOR OPTICAL INFORMATION PROCESSING

CROSS-REFERENCE TO RELATED APPLICATIONS

This application is a National Entry Application of PCT application no PCT/CA2021/050972 filed on Jul. 14, 2021, and published in English under PCT Article 21(2), which itself claims benefit of U.S. provisional application Ser. No. 63/051,435, filed on Jul. 14, 2020. All documents above are incorporated herein in their entirety by reference.

FIELD OF THE INVENTION

The present invention relates to optical information processing. More specifically, the present disclosure is concerned with a nonlinear optical system and method for optical information processing.

BACKGROUND OF THE INVENTION

Although current optical detection and manipulation methods of optical pulses and pulse sequences, for applications such as signal processing, telecommunications and sensing for example, are well developed, emerging applications such as high-bandwidth processing and pico-femtosecond scale measurement still typically depend on bulky, expensive, resource inefficient hardware and software methods. For instance, achieving high-bandwidth detection of optical pulses still requires expensive high-bandwidth infrastructures, typically of the GHz-scale, and high-computational powers.

All-optical-based methods used for high bandwidths (THz) and in turn detection or processing speeds, low power consumption, potentially even fully passive operation require multiple active components and thus suffer from insufficient wall-plug efficiencies and lack versatility with task-specific operation unsuited towards multiple applications such as wavelength-conversion, de-multiplexing, channel equalization, or correlation/pattern recognition for example. Machine learning methods for the classification, prediction and processing of speech, pictures, and sensor data generally rely on software-based approaches and are still limited by resource efficiency and signal bandwidth.

Thus, currently, ultrafast high bandwidth electronics (over 70 GHz) and complex optical multiplexing methods are available to reach data rates in a range between about 10s and about 100s Tbit/s. Optical approaches for real-time and ultrafast (in the femtosecond range), temporal pulse detection and processing that are based on nonlinear optical effects such as four-wave mixing (FWM) in different media or tapped delay line systems mainly relying on traditional telecommunication procedures and protocols. For instance, tapped delay lines are used for channel equalization and bit-stream correlation tasks as they are relevant for increased data spring up.

Research on optical machine learning, such as neuromorphic photonics for example, is going on to more efficiently process data optically. For example, photonic implementations are designed in a way that emulates brain-like behavior, allowing picture or vowel/speech recognition for example. A recurrent neural network, or reservoir computing, is used to design a physical implementation of a given task: nonlinear optical elements such as electro-optic modulators perform a nonlinear transformation on input data points, the data being generally electro-optically encoded, and thus achieve a linear separation in a higher dimension. In a physical implementation of deep learning architectures such as feed-forward networks, a direct implementation of a neural network architecture was developed on a chip or with diffractive elements to perform vowel or picture recognition tasks, respectively.

On the one hand, classical processing methods using high-bandwidth electronics above 70 GHz require recently developed, cutting-edge systems which are limited in availability, expensive and thus not accessible at large scale. Additionally, using electronics implies a trade-off between measurement duration, detection bandwidth and detection sensitivity. On the other hand, optical schemes usually operate at very low speed/sampling rate, as exemplified in current temporal pulse measurement systems, and require complex and slow algorithms, for example for pulse reconstruction. Moreover, these concepts usually rely on optical-electronic and electro-optic conversion steps, and the high speeds and bandwidths available using light are thus limited by—optic bottleneck limits.* Furthermore, current optical processing schemes, such as current feed-forward optical neural network concepts, including using machine learning techniques for the experimental design, are generally highly customized in relation to a given specific task or a given type of input, and thus lack versatility. A discrepancy between the designed and observed performance of the system, referred to as the component imprecision, is typically observed. Specifically, the reported accuracy of systems performing classification tasks are as low as −50% and in general lower than expected from simulations and prior error analysis, as design considerations arising from simulated designs fail to fully account for system inconsistencies such as noise, crosstalk, or used samples for instance. This in turn results in lack of convergence in terms of failing to find a global or local minimum for the desired target function, and of robustness, ultimately of a limited prediction quality. Highly complex architectures, consisting of either hundreds of elements or specifically designed components, in which the component imprecision plays an increased, are used. The degree of customization during the design and fabrication steps is a barrier to processing speeds and mass availability. Lastly, most of the optical implementations still suffer from additional bottlenecks such as electro-optic signal conversion for encoding information, which ultimately limits processing speeds to GHz rates or less, or require a full read out the system information, thereby necessitating high spectral resolution and bandwidth at the detection side; moreover, they are largely application-specific, still lacking the demonstration of highly versatile task operation, besides different bench-marking tasks, in a single platform moreover, they are largely application-specific, still lacking the demonstration of highly versatile task operation, besides different bench-marking tasks, in a single platform.

There is still a need in the art for a nonlinear optical system and method for optical information processing.

SUMMARY OF THE INVENTION

More specifically, in accordance with the present invention, there is provided an optical information processing system, comprising a nonlinear element selected in relation to input optical pulses to initiate nonlinear optical frequency conversion and a detection unit; the nonlinear element receiving encoded information input in form of pulsed light, pulsed light from the nonlinear element being read-out by the detection unit for spectro-temporal feature extraction, the readout being one of: i) used to train the system on a specific target to obtain a task-specific output and ii) redirected to the nonlinear element to obtain an input-dependent output; yielding processed information comprising selective positions in an output of the system.

There is further provided a method for training an optical system; the method comprising for each individual optical input information, reading specific optical amplitude or phase features from specific output bins of the system in time or frequency, weighting and evaluating the specific features towards optimizing user-defined fitness function to identify, classify, or fit the input information.

There is further provided an optical information processing method, comprising processing information input in form of pulsed light in a nonlinear element, and reading out for spectro-temporal feature extraction.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 0.4 is a flowchart of a method according to an embodiment of an aspect of the present disclosure;

DESCRIPTION OF ILLUSTRATIVE EMBODIMENTS

The present invention is illustrated in further details by the following non-limiting examples.

Figure 1:
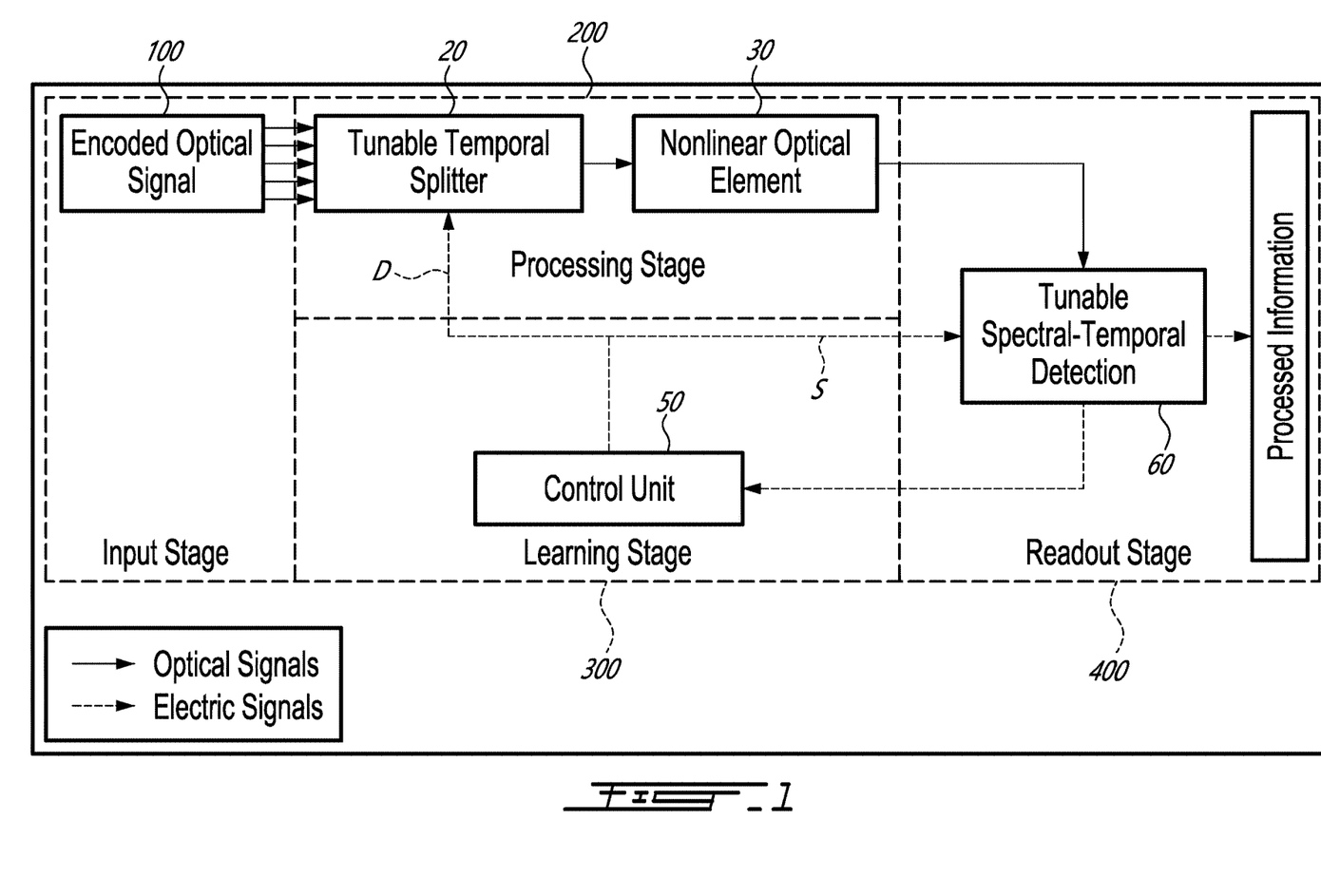
FIG. 1 is a schematic view of a system according to an embodiment of an aspect of the present disclosure.

An optical information processing system according to an embodiment of an aspect of the present disclosure as illustrated in FIG. 1 generally comprises an encoding unit 100 (input stage), a processing unit 200 (processing stage), and a measurement unit 60 (readout stage 400), and generates processed information comprising selective positions in an output of the system.

The encoding unit 100 encodes information on an optical signal from an optical source. The input optical signal may be a sensor signal, image signal, optical ranging signal, optical tomography signal, telecom signal, or information carrying optical pulse series. The input optical pulses are femtosecond pulses, of a time duration in a range between about 1 fs and about 10000 fs and a spectral bandwidth below 100 nm.

The processing unit 200 comprises a nonlinear optical element 30 selected in relation to the input optical pulses to initiate higher harmonic generation, such as second harmonics generation, sum frequency generation, difference frequency generation, for example, by one of a cascade of ones of four-wave mixing, soliton fission, dispersive wave generation, modulation instabilities, cross-phase modulation, and self-phase modulation, for example.

The nonlinear optical element 30 receives encoded information input in form of pulsed light. The nonlinear optical element 30 may comprise highly-nonlinear fibers, dispersion-shifted fibers, highly-doped fibers, soft-glass fibers, liquid-core fibers, hollow-core fibers, photonic crystal fibers, and chip-integrated nonlinear waveguides for example.

The measurement unit 60 comprises a tunable spectral and/or temporal detector, such as an optical spectral analyzer; a dispersive optical element coupled to a detector, a dispersive optical element coupled to a detector array; and an interferometric spectro-temporal pulse retrieval device, for example.

Figure 2A:
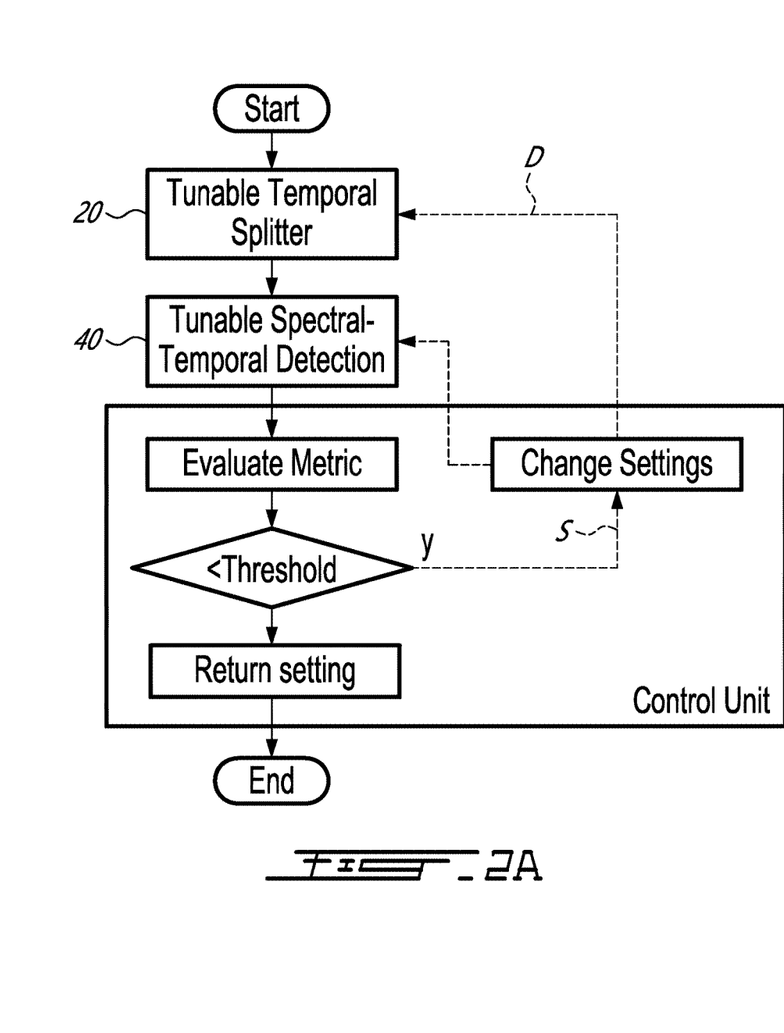
FIG. 2A is a flowchart of a method according to an embodiment of an aspect of the present disclosure.

In an embodiment, the system comprises an additional tunable spectral routing element 20 processing the input optical signals, such as a tunable temporal splitter for example as illustrated in FIGS. 1 and 2, before the nonlinear optical element 30, for a random change of the settings; the processed information comprises a selective readout of the system output, i. e. specific features after selection of specific positions in the output as will be described hereinbelow and referred to as elective readout (see FIG. 1 and FIGS. 2A, detection unit 60, arrow S) as will be described hereinbelow.

In an embodiment, the processing unit is electrically interfaced to a computer or microprocessor (control unit 50) and the settings are adaptively changed based on the readout through feedback-control system (see 1 and FIGS. 2A, arrow D), as will be described hereinbelow.

The tunable spectral routing element 20 comprises reconfigurable optical elements selected to achieve an adjustable range of functions and operations for a range of signal processing tasks, such as for example logic operations, regression tasks or signal correlation, through the nonlinear element 30 in the processing unit. The tunable spectral routing element may be a multi-channel wavelength division multiplexer with variable attenuators; a dispersive element coupled to a micro-electro-mechanical-system, a dispersive element coupled to a spatial light modulator, a dispersive element coupled to a complex spatial filter; waveguide-based filters, such as Bragg-grating arrays, Fabry-Perot cavities or microresonator cascades. The tunable spectral routing element 20 may be a tunable temporal splitter comprising on-chip cascaded MachZehnder interferometers as illustrated hereinbelow, or frequency-dependent phase masks for example.

The resulting signal detected by the tunable-spectral temporal detector 60 may be used by a control unit 50 (Learning stage 300). The system may be trained on a given target (arrow S in FIGS. 1 and 2A) in supervised training, by randomly changing the voltage settings of the temporal pulse splitter 30 and the frequency or wavelength bins of the detector 60; or by changing current settings, or phase values in case the processing unit uses phase masks, of the temporal splitter 30, and voltages, currents, or time as settings of the detector 60 in case an optical gate is implemented, for example.

The resulting signal detected by the tunable-spectral temporal detector 60 may also be re-directed to the processing unit to obtain an input-dependent system output (arrow D in FIGS. 1 and 2A), with an adaptive change of settings of the system, by changing the voltage settings of the switches in the on-chip MachZehnder interferometers of the tunable temporal splitter for example.

The system may also be operated in a stand-alone mode. An optical signal, of a pulse duration in a range between about 30 fs and about 10 ps for example and spectral widths of at most 100 nm, and Gaussian, Lorentzian or sech-squared spectral envelope shape for example, is injected from a pulsed laser source, and information is encoded on the optical signal temporally or spectrally via phase or amplitude masking with a tunable spectral filter or a tunable temporal splitter as described hereinabove for example. The tunable temporal splitter may be an interferometer-based pulse splitter for example. The nonlinear optical element may be a highly nonlinear fiber or nonlinear waveguide. The tunable spectral and/or temporal detector may be an optical spectrum analyzer, a dispersive fiber coupled to an ultrafast photodiode, or a dispersive imaging system. The control unit 50 may be a computer or a microprocessor.

The encoded optical signal is modified into multiple coherent copies with adjustable relative powers using optical switches in the tunable temporal splitter or using a complex phase mask on the optical signal at the encoding stage. The nonlinear and dispersion-induced interactions of the input signal with the pulse multiple coherent copies occur in the nonlinear optical element, thereby processing the input signal in a complex but deterministic way. The nonlinear and dispersion-induced interactions may comprise nonlinear frequency mixing, dispersive broadening, among others, of the pulses.

Then signal readout takes place in the tunable spectral and/or temporal detector 60 (See FIG. 1). The detector may comprise a physically tunable element such as a temporal or spectral filter, or software-based processors using digital filters or software-based neural networks for example.

For the system to be trained to converge on a specific operation such as classification, regression or clustering, the signal from the readout stage is sent to the control unit (arrow S in FIGS. 1 and 2). The system may be trained either in the encoding stage (feed-forward type I), or during linear processing (feed-forward type II, FIG. 4, Case B), or during tunable detection (random reservoir type, FIG. 4, Cases A and C), or any combination of these methods (A, B, C, A and B, B and C, A and C and A, B and C). The detected signal is evaluated by a task-specific metric or loss function in a supervised learning method. Alternatively, unsupervised or reinforcement learning techniques, or a combination thereof, may be used. Training may further comprise optimization techniques such as evolutionary optimization in order to improve convergence.

Once the system is trained for the specific task, the detection is done in a fully passive way, in absence of active electro-optic modulation and the control unit is no longer required.

Figure 2B:
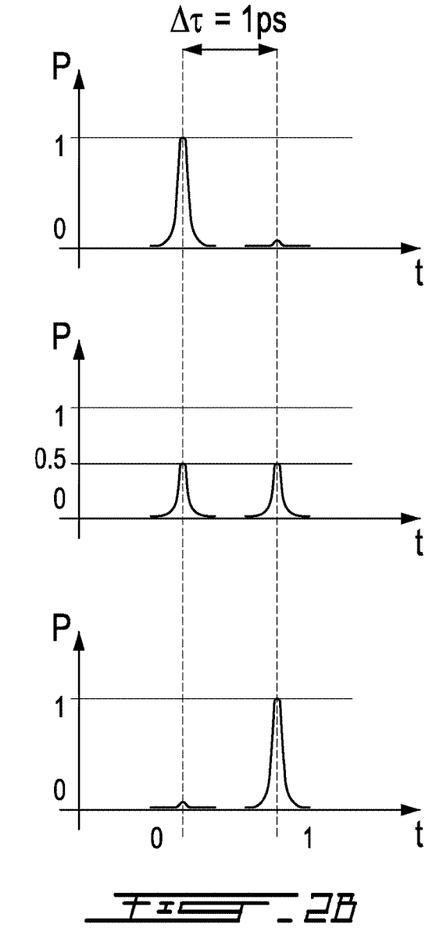
FIG. 2B shows experimental encoded information used for classification according to an embodiment of an aspect of the present disclosure.

FIG. 2B shows an example of experimental encoded information used for classification. Two pulses with a 1 ps temporal separation enter the tunable temporal splitter. During training, the pulse ratio is altered between 0, where the second pulse is full power, and 1, where the first pulse is full power.

The system can thus be trained for a range of specific tasks, and is re-configurable. The detection stage can be implemented to resolve one or multiple degrees-of-freedom including frequency, time, etc., and can thus provide a means for multi-input all-optical data processing.

Figure 3A:
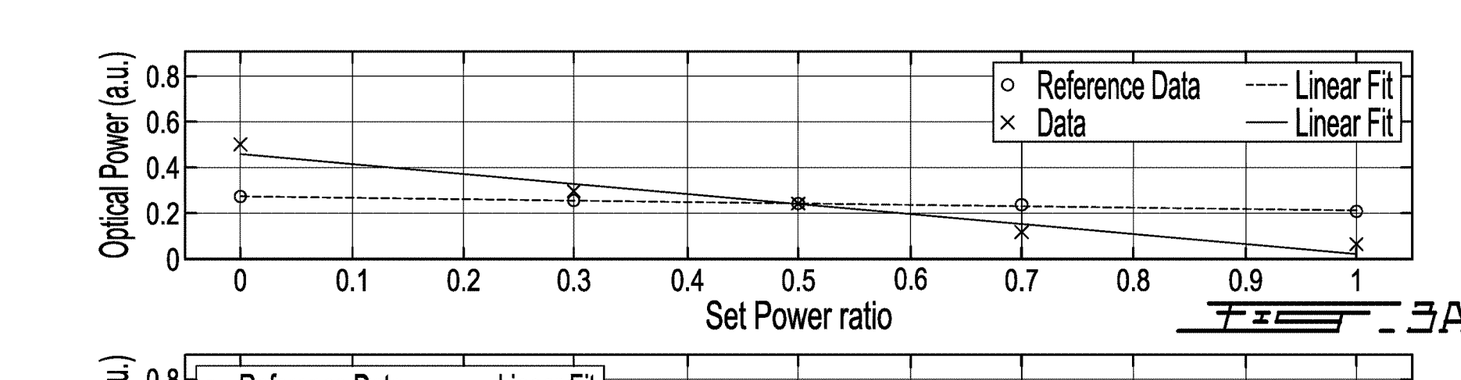
FIG. 3A shows optical power as a function of set input power ratio, for a reference with 0 active switches (dashed line), and for returned optimum switch settings with 3 active switches (full line)
Figures 3B, 3C:
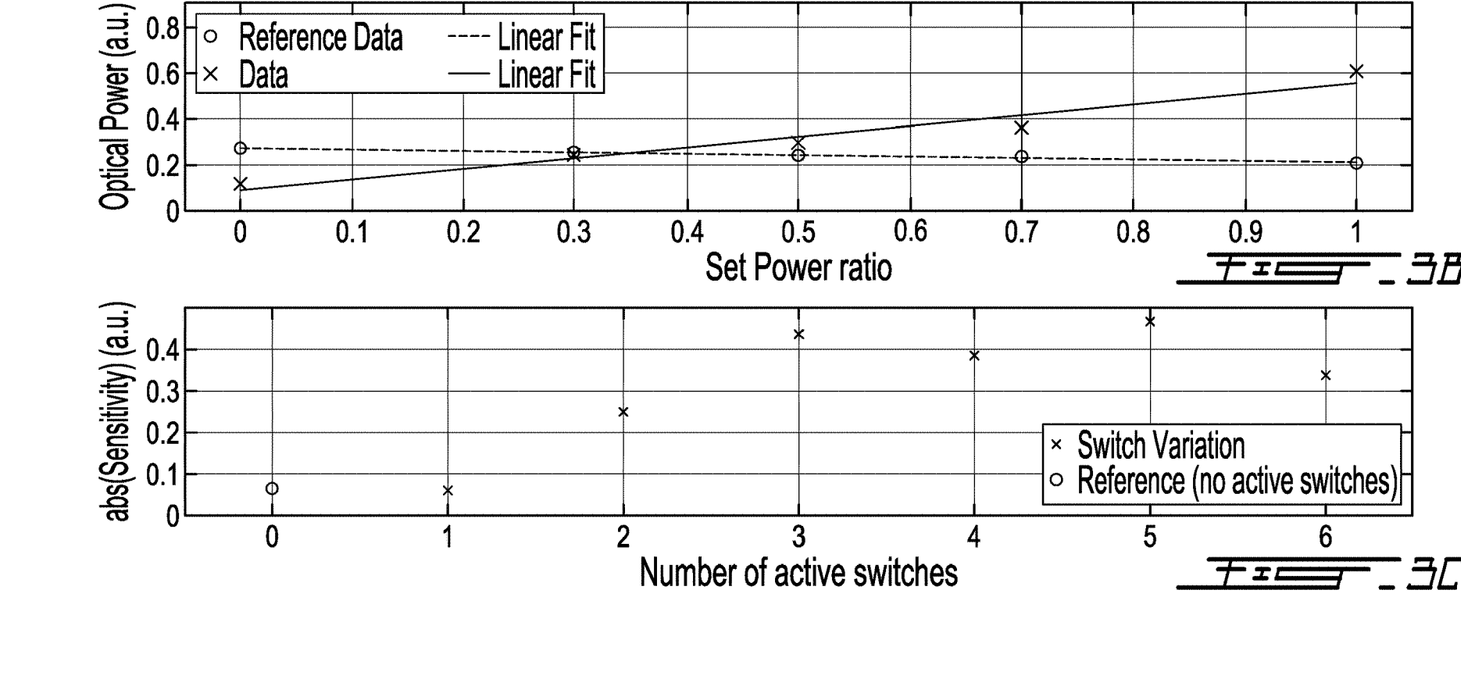
FIG. 3B shows optical power as a function of set input power ratio, for the reference (dashed line), and for returned optimum switch settings with 5 active switches (full line)
FIG. 3C shows an analysis for a fixed wavelength window of 5.5 nm as a function of the number of active switches.

FIG. 3 show experimental results. As in the example of FIG. 2B, two input pulses separated by 1 ps were used, with the aim of improving the detection sensitivity, defined as the ability to distinguish between different input pulse ratios. For training, the power ratio of the two pulses was linearly changed between 0 and 100%:either only the second pulse (FIG. 2B, Top) or only the first pulse (FIG. 2B, Bottom) or two pulses with varied ratios (FIG. 2B, Middle). As the pulse power ratios are thus changed, different nonlinear interactions in the nonlinear optical element, which was a highly nonlinear fiber in this case, take place, resulting in correspondingly different output signal spectrum from the fiber, which was in this case a supercontinuum.

This output signal was measured for all input power ratios using a spectral filter and photodetector. This may also be achieved using a scanning optical spectrum analyzer and software filtering. The detected signal, in this case an optical power measurement, was evaluated and its variation across the set input power ratio values was observed. The distribution of this signal determines how easily it can then be mapped back to the original target variable of pulse power ratio, effectively demonstrating a classification/regression operation. The processing unit may be trained towards specific target operations by iteratively changing the encoding mask, and/or the temporal splitting and/or spectral filtering following the fiber, in order to minimize the detected signal distribution, and hence the classification or regression error, measured as a loss function, or, equivalently, to maximize a reward function. The training iterations may be mediated by brute-force, by example by parametric optimization, or by guided approaches such as for example genetic algorithms, and/or error back-propagation for example.

With a linear regression training as an example, different operation regimes can be obtained depending on the number of switches considered for the training (see FIG. 3). In each case of FIGS. 3A and 3B, the obtained results are compared to a reference case where only the power ratio changes and the tunable temporal splitter is turned off. The reference case corresponds to detecting the two input pulses without the temporal splitter while using the same spectral filtering bandwidth and detection method. FIG. 3A shows the optical power as a function of the set input power ratio, for the reference when all switches are set to short path thus with 0 active switches (dashed line), and for returned optimum switch settings with 3 active switches (solid line), from a method that returns the highest slope with the same algebraic sign. FIG. 3B shows the optical power as a function of the set input power ratio, for the reference (dashed line), and for returned optimum switch settings with 5 active switches (solid line), from a method which returns the highest slope with the opposite algebraic sign by signal inversion.

Two operation regimes of particular interest could thus be achieved. Firstly, the detection sensitivity, defined as the rate of output signal change as a function of input power ratio, can be increased while maintaining a negative slope, compared to the reference case as shown in FIG. 3A. Secondly, FIG. 3B shows the detection sensitivity can be increased with a positive slope demonstrating effective signal inversion. In both operation regimes, the monotonic behavior is maintained, which is a mandatory condition for distinguishability, meaning that no power ratio shows the same power value. The optimal temporal splitting settings, obtained through learning as discussed hereinabove FIGS. 1 and 2A, allow in both cases an increase in detection sensitivity, as evidenced by the higher linear regression slope compared to the reference case. Thus, for example, higher classification accuracy is achieved, as it is then easier to separate different input classes by measuring different power, voltage or current values. In case of other tasks such as correlation or regression, an inverted response can be contemplated. Moreover, as shown in FIG. 3C, when using the tunable temporal splitter, in this example an interferometer-based pulse splitter, an increase in detection sensitivity depending on the number of splitting units used was obtained, allowing for further control over the operations.

Figure 4:
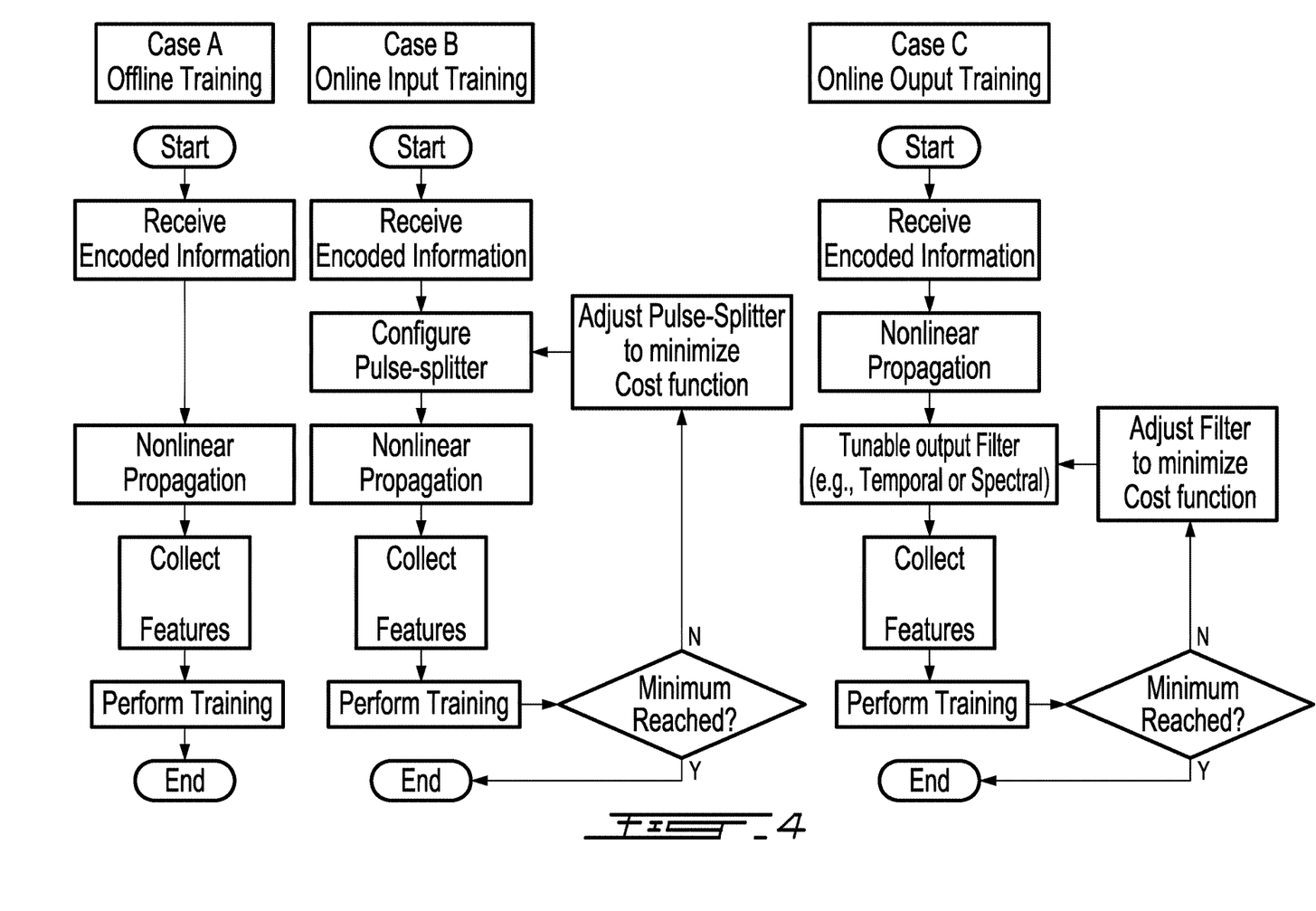
Figure 5A:
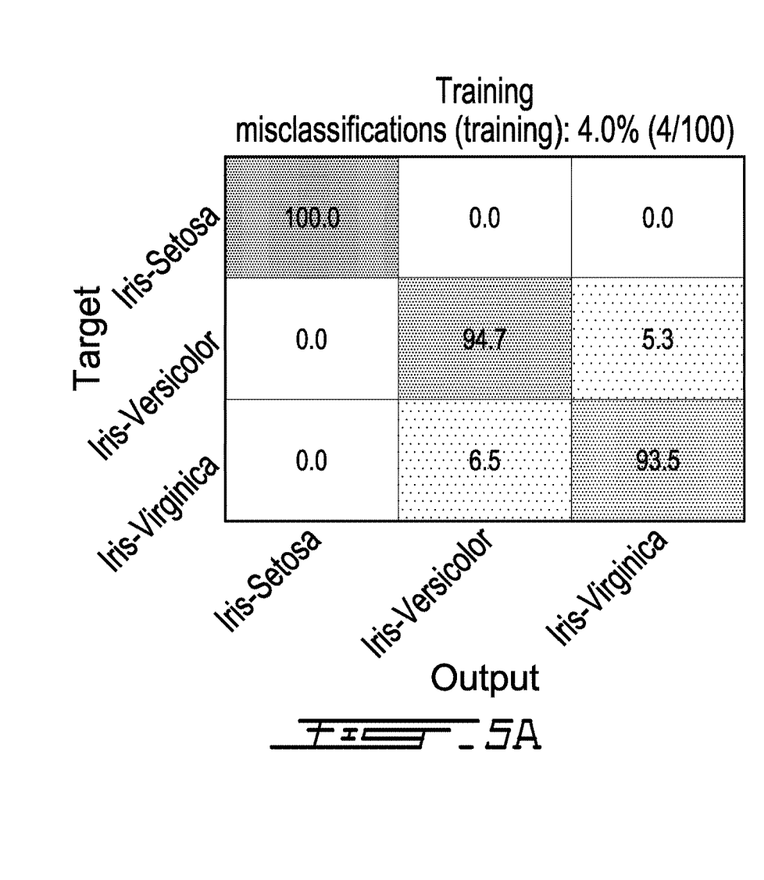
FIG. 5A shows the results of the training of the IRIS nonlinear classification using a stand-alone configuration in Case A of FIG. 4.
Figure 5B:
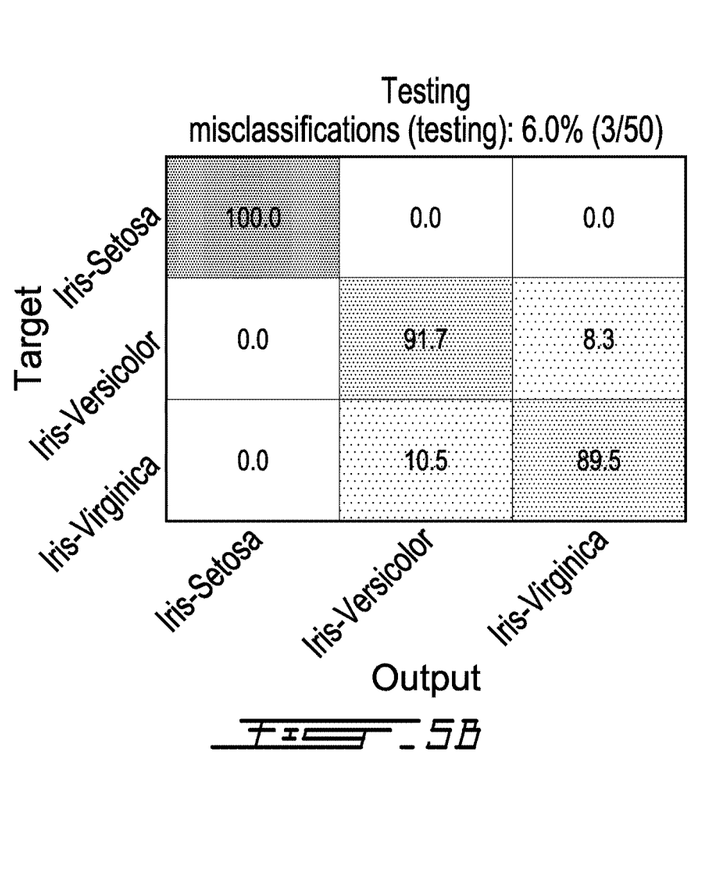
FIG. 5B shows the results of the system testing of the IRIS nonlinear classification using a stand-alone configuration in Case A of FIG. 4.

As mentioned hereinabove, the system may also be used for stand-alone operation by making use of temporal or spectral encoding before the nonlinear element. FIGS. 4 and 5 show an example for a nonlinear classification task using the IRIS flower classification benchmark for the identification of IRIS plant species on the basis of plant attribute measurements. FIG. 4 shows different training configurations: offline-training, using for example the extreme-learning machine paradigm (Case A); online input training (as for pulse-splitter results in FIG. 3 for example) (Case B), and online output training (as used for the readout in FIG. 5 for example) (Case C). The presented invention is not limited to one case and a combination can be employed.

In all cases, the nonlinear element receives encoded information input in form of pulsed light, which is subsequently read-out for spectro-temporal feature extraction. Training of the system to a user-defined task may be performed in the different configurations. In offline-training configuration (Case A in FIG. 4), the system output is electronically recorded and post-processed digitally by optimization using genetic algorithm or swarm algorithm for example, or machine-learning using backpropagation, gradient descent, reinforcement learning for example, in order to retrieve an input-specific system response. In online input training (Case B in FIG. 4), a tunable temporal pulse splitter is used between the input and the nonlinear medium, the signal output is electronically evaluated and fed back to the tunable temporal splitter for improving feature distinguishability. In online output training configuration (Case C in FIG. 4), a tunable spectral and/or temporal filter is used after nonlinear propagation in the nonlinear element and optimized in order to extract output features and improve their discrimination. The method and system of the present invention are not limited to one of the presented training configurations and a combination thereof may be used.

FIG. 5 illustrates nonlinear classification IRIS using the stand-alone offline-training configuration as outlined in Case A of FIG. 4. FIG. 5A shows the results of the training and FIG. 5B shows results of system testing. The spectral readout output bins, one per class, are determined by an optimization algorithm. The four features of each orchid blossom are encoded into the spectral phase of the input pulse. Subsequently, the pulse-splitter was used only in a passive, pass-through setting and training was performed on a digital computer with 100 training samples. As result of the training three different wavelength bins were identified as spectral regions of highest input distinguishability, namely a wavelength bin class centered at 1371.2 nm, a wavelength bin class centered at 1507.9 nm and a wavelength bin class centered at 1621.6 nm, each having a 0.4 nm bandwidth. The location of the bins can be randomly distributed and weighted, or obtained using optimization algorithms. FIG. 5A shows the output class predictions of the system versus the targeted class labels after the system training on the three best wavelength bins, featuring an accuracy of 96%. FIG. 5B shows the output class predictions of the system versus the targeted class labels after the optimized wavelengths bins and weights were applied to 50 test samples, yielding a classification accuracy of 94%. Afterwards, the selected spectral features of interest were recorded in three different wavelength bins, one per class, but not limited to one bin per class, centered at 1371.2 nm, 1507.9 nm and 1621.6 nm, respectively, 0.4 nm bandwidth each. The location of the bins can be randomly distributed, or obtained using algorithms.

As people in the art will now be in a position to appreciate, the system and method as illustrated in the present disclosure achieve robust and all-optical signal processing of encoded optical inputs of multiple degrees of freedom, such as frequency, time, phase etc., in absence of task-specific conditions.

The system outputs selective read out thus reducing requirements for high spectral resolution and bandwidth at the detection side. In the method for training the optical system, for each individual optical input information, specific optical amplitude or phase features are read out from specific output bins of the system in time or frequency, weighted, and evaluated towards minimizing, or maximizing, user-defined cost function or system penalty, i.e. fitness function or system reward, in order to identify, classify, or fit the input information. The weights are determined through learning algorithms, such as linear regression, ridge regression, gradient decent, error back propagation, or optimization algorithms. The evaluation error/gain may be found using statistical metrics, such as mean square error, information entropy, number of misclassifications. The number and specific positions of the output bins in time and/or frequency may be selected randomly, or found iteratively through parametric search algorithms; evolutionary optimization algorithms; or software-based artificial neural networks.

The method may be applied to a tunable routing system (Case C, FIG. 4). For a selected number of output bins at pre-defined locations and read-out weights, the system may be trained via variable temporal amplitude splitting and phase control of the encoded input pulse, using a measurement monitor at the system output and a processing unit for feedback control (Case B, FIG. 4); in the control weights for the temporal splitting, ratios and phase values are determined through learning algorithms, such as linear regression, ridge regression, gradient decent, error back propagation, or optimization algorithms; the evaluation error/gain may be found using statistical metrics, such as mean square error, information entropy, number of misclassifications.

For a selected number of output bins at pre-defined locations and read-out weights, the system may be trained via variable spectral phase and/or amplitude masking of the encoded input pulse, using a measurement monitor at the system output and the processing unit for feedback control; the control weights for the spectral amplitude and phase filter settings are determined through learning algorithms, such as linear regression, ridge regression, gradient decent, error back propagation, or optimization algorithms; the evaluation error/gain may be found using statistical metrics, such as mean square error, information entropy, number of misclassifications.

Specific features in the output are obtained using optimization or machine-learning.

A single system, allowing reconfigurability to perform different tasks, is provided.

In addition, the present system may be transferred onto a single chip using complementary-metaloxide-semiconductor (CMOS) compatible materials, processes and operation voltages, for inexpensive, low power consuming, mass-producible optical signal processors.

Due to high versatility, the system and method can be used to increase the detection sensitivity in applications such as optical spectroscopy, or applications in the field of telecommunications as a tool in optically assisted signal processing for signal regeneration, optical logic operations such as inversion, or optical correlation/classification tasks for example, with a high bit rate and in a passive manner. In addition, the proposed system allows to characterize the dispersion of optical transmission lines, for applications in digital signal processing techniques in current telecommunications systems for example.

Furthermore, the present system and method can perform the aforementioned tasks without being specifically designed for specific tasks.

The present method may be combined with traditional machine learning techniques, and the system can perform the preprocessing of data in order to reduce the complexity of input signal, by dimensionality reduction, and after detection the processed information can be provided directly to other functional devices, such as providing an optical sensor signal directly to an actuator for example, or transferred to classical, software-based or physical, machine learning architectures such as feed forward or recurrent neural networks.

The scope of the claims should not be limited by the embodiments set forth in the examples but should be given the broadest interpretation consistent with the description as a whole.

The invention claimed is:

1. An optical information processing system, comprising a nonlinear element selected in relation to input optical pulses to initiate nonlinear optical frequency conversion and a detection unit; the nonlinear element receiving encoded information input in form of pulsed light, pulsed light from the nonlinear element being read-out by the detection unit for spectro-temporal feature extraction, the readout being one of: i) used to train the system on a specific target to obtain a task-specific output and ii) re-directed to the nonlinear element to obtain an input-dependent output; yielding processed information comprising selective positions in an output of the system.

2. The system of claim 1, comprising a tunable spectral routing element before the nonlinear element, for a random change of settings of the system.

3. The system of claim 1, comprising a tunable spectral routing processing the input optical pulses element before the nonlinear element, and a control unit for an adaptive change of settings of the system based on the readout through feedback-control.

4. The system of claim 1, wherein the input optical pulses have a time duration in a range between 1 fs and and 10000 fs and a spectral bandwidth below 100 nm.

5. The system of claim 1, wherein the input optical signals are ones of: sensor signals, image signals, optical ranging signals, optical tomography signals, telecom signals, and information carrying optical pulse series.

6. The system of claim 1, comprising an encoding unit, said encoding unit encoding information on the input optical signal.

7. The system of claim 1, wherein the nonlinear element is selected in relation to input optical pulses to initiate nonlinear optical effects by one or a cascade of ones of: four-wave mixing, soliton fission, dispersive wave generation, modulation instabilities, cross-phase modulation and self-phase modulation.

8. The system of claim 1, wherein the nonlinear element comprises at least one of: highly nonlinear fibers, dispersion-shifted fibers; doped fibers, oft-glass fibers, liquid-core fibers, hollow-core fibers, photonic crystal fibers and chip-integrated nonlinear waveguides.

9. The system of claim 1, wherein the detection unit comprises a tunable-spectral temporal detector.

10. The system of claim 1, the detection unit comprises a tunable-spectral temporal detector, wherein said detector is interfaced to a computer for on-line read-out and further processing.

11. The system of claim 1, comprising a tunable spectral routing element before the nonlinear element, wherein the routing unit is one of: a tunable spectral routing element, a tunable temporal routing unit and a spectro-temporal routing unit.

12. The system of claim 1, comprising a tunable spectro-temporal routing element before the nonlinear element, wherein the routing unit is optically connected to the detection unit and electrically interfaced to a computer for feedback-control.

13. The system of claim 1, comprising a tunable temporal splitter before the nonlinear element for one of: information encoding and input pulse processing, and the tunable temporal splitter is interfaced to a computer for feed-back control according to the readout.

14. The system of claim 1, comprising one of: a temporal, spectral, and spectro-temporal phase and/or amplitude filter unit before the nonlinear element for information encoding or input signal processing, and the filter unit is interfaced to a computer for feed-back control according to the readout.

15. The system of claim 1, interfaced to a computer for feed-back control according to the readout.

16. The system of claim 1, interfaced to a computer for feed-back control according to the readout, by one of machine-learning and optimization.

17. The system of claim 1, comprising a nonlinear element, a tunable spectral, temporal, or spectro-temporal unit, and a feedback circuit from the nonlinear element output that controls the tunable spectral, temporal, or spectro-temporal unit.

18. An optical information processing method, comprising processing encoded information input in form of pulsed light in a nonlinear element, and reading out for spectro-temporal feature extraction, comprising training to a user-defined task by at least one of: i) recording an output and using machine-learning to retrieve an input-specific response, in offline-training configuration; ii) using a tunable temporal pulse splitter between the input and the nonlinear element, evaluating an output and feeding back to the tunable temporal splitter for improving amplitude or phase features distinguishability, in offline-training; iii) using a tunable spectral and/or temporal filter after the nonlinear element to extract the amplitude or phase features in online output training.

19. The system of claim 1, wherein the nonlinear element is selected in relation to the input optical pulses to initiate a cascade of one of: four-wave mixing, soliton fission, dispersive wave generation, modulation instabilities, cross-phase modulation, and self-phase modulation.

20. An optical information processing method, comprising processing information input in form of pulsed light in a nonlinear element, and reading out for spectro-temporal feature extraction, the method comprising training to a user-defined task by at least one of: i) recording an output and using machine-learning to retrieve an input-specific response; ii) using a tunable spectral and/or temporal filter or temporal pulse splitter between the input and the nonlinear element, evaluating an output and feeding back to the tunable temporal splitter for improving feature amplitude or phase features distinguishability; iii) using a tunable spectral and/or temporal filter after the nonlinear element to extract the amplitude or phase features.

\* \* \* \* \*